Feb. 1, 1955

J. T. COVINGTON 2,700,924

CULTIVATING MECHANISM

Filed Oct. 8, 1953

INVENTOR.
John T. Covington

BY Victor J. Evans & Co.

ATTORNEYS

Feb. 1, 1955  J. T. COVINGTON  2,700,924
CULTIVATING MECHANISM
Filed Oct. 8, 1953  3 Sheets-Sheet 2
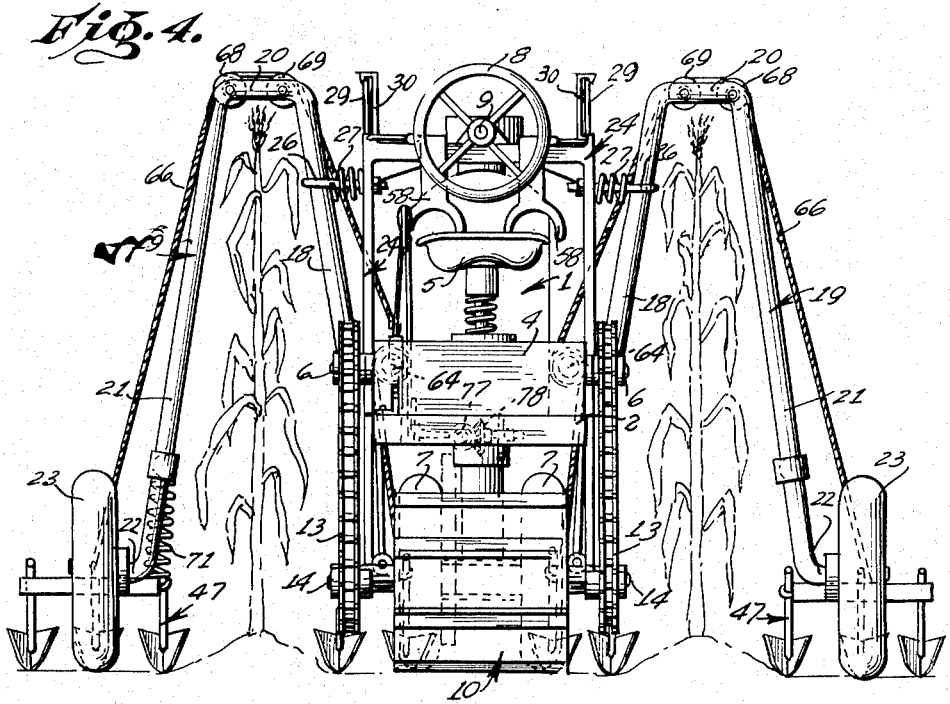
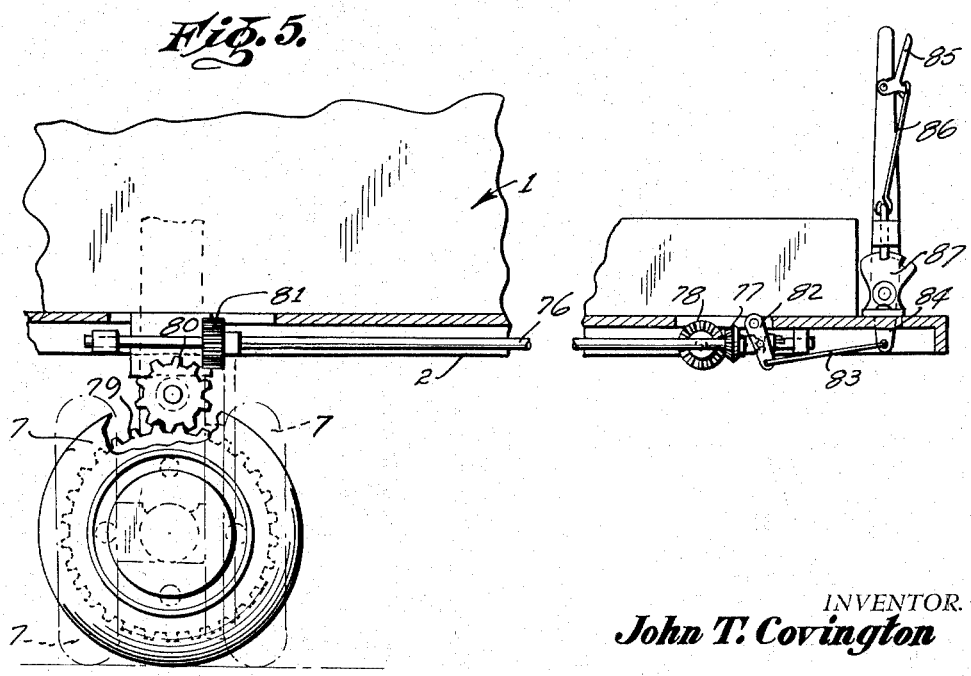
INVENTOR.
John T. Covington
BY Victor J. Evans & Co.
ATTORNEYS

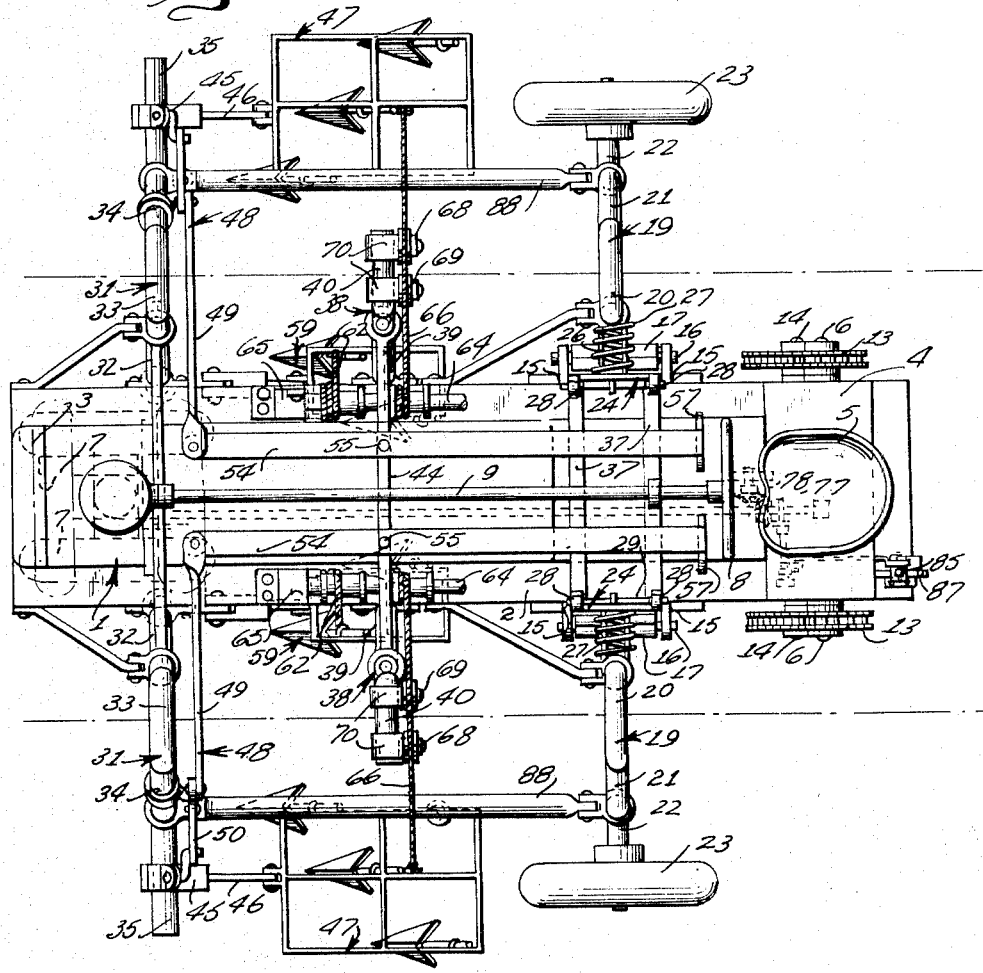

United States Patent Office 2,700,924
Patented Feb. 1, 1955

2,700,924

CULTIVATING MECHANISM

John T. Covington, Coalgate, Okla.

Application October 8, 1953, Serial No. 384,961

1 Claim. (Cl. 97—46.63)

This invention relates to agricultural equipment, and more particularly to a cultivating mechanism.

This invention is an improvement over the cultivating mechanism shown and described in my Patent No. 2,189,707.

The object of the invention is to provide a cultivating mechanism which includes an improved means for adjusting the ground engaging plows as well as a novel means for effecting turning of the apparatus.

Another object of the invention is to provide a cultivator mechanism which includes a caterpillar unit that can be adjusted so as to facilitate turning of the tractor, there being a manually operable means for effecting turning of the tractor, and wherein the front wheels are supplied with power when the tractor is turned.

Another object of the invention is to provide a cultivator mechanism which will effectively cultivate the soil without damaging growing plants.

A further object of the invention is to provide a cultivator mechanism which is extremely simple and inexpensive to manufacture.

Other objects and advantages will be apparent during the course of the following description.

In the accompanying drawings, forming a part of this application, and in which like numerals are used to designate like parts throughout the same:

Figure 2 is a top plan view of the cultivator mechanism.

Figure 4 is a rear elevational view of the cultivator mechanism.

Figure 5 is a fragmentary sectional view showing the drive for the front wheels.

Figure 1:
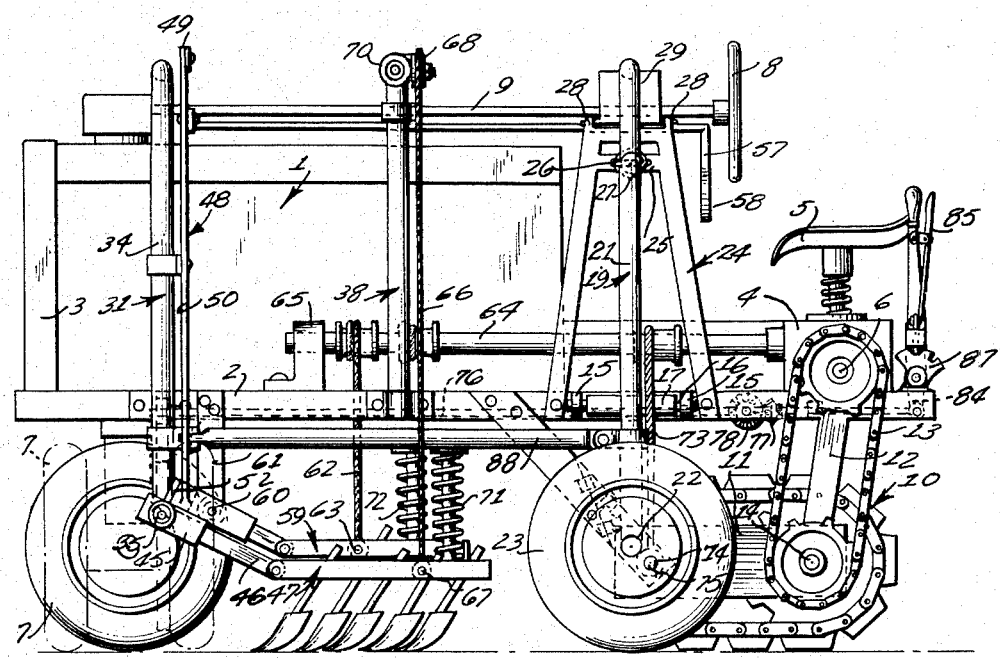
Figure 1 is a side elevational view of the cultivator mechanism constructed according to the present invention.

Referring in detail to the drawings, the numeral 1 designates generally the housing of a tractor in which the power plant is located, and the numeral 2 designates the chassis frame, there being a radiator unit 3 on the front end of the tractor. A transmission mechanism is indicated by the numeral 4 and the operator's seat is indicated by the numeral 5. The driving axle 6 extends laterally from the rear part of the transmission mechanism, and the steering front wheels 7 are located at the front lower portion of the tractor, the wheels 7 being controlled by means of a manually operable steering wheel 8 and a steering shaft 9.

The present invention is especially suitable for cultivating soil when corn is growing as shown in Figure 4 since the corn can be cultivated without doing damage thereto. Disposed below the rear end of the tractor is a caterpillar traction unit 10 which includes a frame 11 that is connected to the frame 2 of the tractor by beams 12 and the caterpillar 10 can be pivoted from the position shown in Figure 1 to the position shown in Figure 3 when the tractor is to be turned. A chain and sprocket coupling 13 connects the axle 6 to a driven axle 14 of the caterpillar unit.

Secured to the frame of the tractor are projecting bearing ears 15 which support a short shaft 16, and the shafts 16 are arranged in opposed relation with respect to each other. A bearing box 17 is connected to the shaft 16 and the bearing box 17 is secured to the inner leg 18 of an inverted substantially U-shaped structure, indicated generally by the numeral 19 and called a wheel bow. The upper end of the bow includes a short horizontal portion 20 which forms the yoke of the U, while the outer leg of the U is indicated by the numeral 21. The outer leg 21 is of greater length than the inner leg 18 and extends downwardly below the frame 2 and terminates in a horizontal laterally extending stub axle 22 which carries a wheel 23.

Extending upwardly from each side of the frame 2 at the inside of each wheel bow 19 is a stabilizing frame 24 which includes a bar portion 25. Extending through the bar portion 25 is a U-bolt 26 which encircles the adjacent leg 18 of the bow and which supports an expansion spring 27, the spring 27 serving to normally urge the bow to swing outwardly. Thus, the bow will normally maintain a vertical position when the wheel 23 is on a surface level with that occupied by the traction unit 10.

The top of the frame 24 is provided with hinge ears 28 between which is movably mounted a lock plate 29, and a spring latch 30 normally keeps the plate 29 in vertical position. The lock plate 29 when released by latch 30 to swing outwardly and downwardly, serves to prevent inward movement of the bows.

Arranged at the front end of the frame 2 is a plow hitch bow indicated generally by the numeral 31, there being two of the hitch bows 31 and each bow comprises an inner leg 32 which has its lower end secured to the frame 2. There is further provided a horizontal yoke portion at the top which is indicated by the numeral 33, and an outer leg 34 which terminates in an outwardly extending hitch bar 35. The legs 32 of the hitch bows may be interconnected together by a cross bar, and the upper ends of the frames 24 may be interconnected together by a cross bar 37.

Arranged at opposite sides of the machine between the bows 19 and 31 are intermediate standards which are indicated generally by the numeral 38. Each of the standards 38 includes a long inner leg 39 that is secured to the frame 2, and an outwardly extending portion 40 at the top. The standards 38 are interconnected by a cross bar 44. The standards 38 serve as supports for the pulleys 68 and 69.

The hitch bar 35 of each plow hitch bow has slidably and pivotally mounted thereon a hitch bearing 45 to which is pivotally connected an end of a link 46, and the link 46 is also connected to the cultivator plow unit 47. Since the bearing 45 is slidable on the supporting bar 35, lateral adjustment of the attached plow units can be effected so that the cultivator structure can be moved in or out as required to follow the rows of plants which the machine is cultivating. For moving the plow units, a rocking frame 48 is mounted on each plow hitch bow and the rock frame 48 includes a top bar portion 49 having one end connected to a vertical outer bar 50 which is connected by a link 52 with the adjacent slide bearing 45.

Extending longitudinally of the machine across the tops of the brace bars, are control rods or bars for the plow shifting frame units 48, and these control rods are indicated by the numeral 54. Each of the bars 54 is pivoted as at 55 to the center cross brace bar 44, and links may connect the bars 54 to the bars 49. The rear end of each of the bars 54 terminates in a downturned portion 57 which includes a collar 58 for receiving the knee or upper portion of the leg of the operator of the vehicle when the operator is sitting on the seat 5. By oscillating the bars 54, the operator will be able to oscillate in a vertical plane the frames 48 to thereby slide the bearings 45 upon their supporting bars whereby the plowing units 47 can be moved inwardly or outwardly as desired and this can be accomplished while the operator maintains his hold upon the steering wheel 8. The mechanism for moving the plow units 47 is shown in detail in my Patent No. 2,189,707, and this mechanism including the bars 54 and rocking frames 48 form no part of the present invention. Arranged inwardly of each of the cultivator plow frames 47 is a plow frame or cultivator 59 which also carries plows for engagement with the ground, and each of the plow frames 59 may be pivotally connected to a vertical bar 61 by a pivot pin 60. The member 61 may be secured to the frame 2 in any suitable manner, and it will be seen that the frames 47 and 59 can both be raised from the position shown in Figure 1 to the position shown in Figure 3 when desired. For raising the frame 59, a cable 62 has one end connected to the frame 59 by a securing element 63, and the cable 62 is trained over a shaft 64 that is driven by a power take-off from the transmission mechanism 4. There are two of the shafts provided one for each side of the tractor, and the shafts 64 may have their front ends rotatably supported by bearings 65. For raising the outer frames 47, a cable 66 has one end connected to the frame 47 by a securing element 67, and the cable 66 is trained over pulleys 68 and 69 which are supported by the upper portion of the intermediate standard 38, the pulleys being secured to the bow by brackets 70, Figure 2. After passing over the pulleys 68 and 69, the cable 66 is connected to the adjacent shaft 64. Springs 71 and 72 are provided for maintaining a downward pressure upon the underlying plow unit so that it will be seen that the springs 71 and 72 will be placed under tension when the plow unit is raised to the position shown in Figure 3 by rotation of the shaft 64.

The traction unit 10 includes a hold-down mechanism which comprises a manually operable latch or keeper 90 that includes a transverse portion that is mounted for movement into and out of engagement with an opening 91 in the stationary frame member 92. The latch 90 can be manually disengaged from the opening 91 when the traction unit is to be pivoted or raised.

Figure 3:
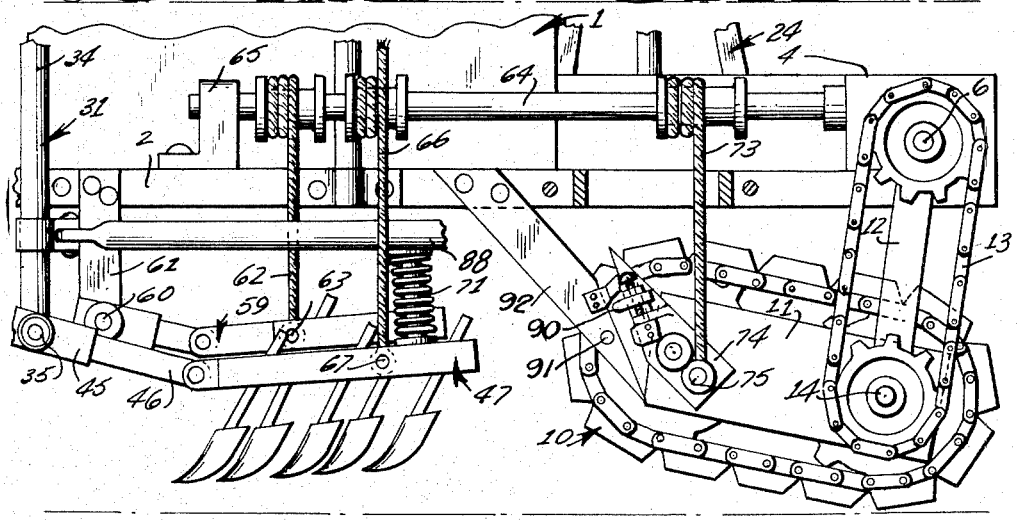
Figure 3 is a fragmentary side elevational view and showing the plow and caterpillar in raised position.

A means is provided for lifting the front end of the caterpillar unit 10, and this means comprises cables 73 which are trained over the shafts 64 and connected thereto. The lower ends of the cables 73 are connected to a body member 74 which may be secured to the traction unit 10, and the cable 73 is secured in place by a suitable securing element 75. By raising the front end of the traction unit 10 as shown in Figure 3 the tractor will be able to turn more easily since only the rear edge of the traction unit will be in engagement with the group.

A means is provided for supplying power to the front wheels 7 when the wheels are turned at right angles to the longitudinal axis of the tractor. This means comprises a rod 76 which is slidably or shiftably mounted below the tractor, Figure 5, and a bevel gear 77 mounted on the rod 76. The bevel gear 77 is mounted for movement into and out of meshing engagement with a bevel gear 78 which is constantly driven by the engine power unit. Interposed between the pair of front wheels 7 and connected thereto is a ring gear 79, and meshing with the ring gear 79 is a gear wheel 80. A gear member 81 mounted on the rod 76 is mounted for movement into and out of meshing engagement with the gear 80 so that when the gear 81 meshes with the gear 80 power will be transmitted to the wheels 7 to rotate the latter when the wheels are turned at right angles to the frame of the tractor as shown in dotted lines in Figure 5.

A manually operable means is provided for shifting or sliding the rod 76, and this means comprises a link 82 which is connected to the rod 76, and a lever 83 interconnects the link 82 to a handle member 84. A brake 85 is connected by a cable or rod 86 to a sector plate 87 whereby the handle member 84 can be maintained immobile in either of its adjusted positions.

Tie rods 88 interconnect the bows 19 and 31 together, Figure 2.

From the foregoing it is apparent that a cultivator mechanism has been provided which is an improvement over the cultivator mechanism shown and described in my Patent No. 2,189,707. With the present invention power is supplied to the front wheels 7 through the sliding rod 76 and its associated gears when the wheels 7 are turned at right angles to the longitudinal axis of the tractor. Thus, the tractor will be able to continue moving even though the front wheels 7 are at right angles to the tractor. The heavy plow frames 47 and 59 as well as the front end of the caterpillar traction unit 10 can be raised by means of the shafts 64 so that the lifting of these members is greatly facilitated. The bows are constructed so that the standing rows of corn or other tall plants can pass therebeneath or therethrough so that the growing plants will not be damaged. The wheels 23 provide a stabilizing means which prevent the tractor from tipping over and the cultivation can be accomplished with great speed and ease. The construction shown in Figure 5 permits the cultivator to achieve or accomplish a short turning radius. The device of the present invention is designed to be driven down between two rows of standing crop and it will cultivate the rows on each side thereof.

I claim:

In combination, a tractor including an engine and a transmission mechanism arranged rearwardly of said engine and driven thereby, front and rear pairs of bows, each bow having a substantially inverted U-shape mounted on the tractor for the passage therethrough of growing crops, standards mounted on the tractor and interposed between said front and rear bows, pulleys supported on said standards, ground engaging wheels mounted on the rear pair of bows, a caterpillar traction unit, arranged at the rear end of the tractor below said transmission mechanism, spaced apart cultivator units pivotally mounted on said tractor and on said front bows, means for simultaneously adjusting said cultivator units and caterpillar traction unit, said means comprising spaced parallel shafts extending forwardly from said transmission mechanism, and cables connected to said shafts and to the front portion of said traction unit and to the rear ends of said cultivator units, the cables connecting the shafts to the cultivator units mounted on said front bows being trained over said pulleys, and means for supplying power to said front wheels, said last named means comprising a ring gear interposed between said pair of front wheels and connected thereto, a gear wheel meshing with said ring gear, a rod slidably mounted below said tractor, a gear member mounted on the front end of said rod for selectively engaging said ring gear, and a gear arranged on said rod for movement into and out of engagement with a bevel gear operated by the tractor engine, whereby when it is desired to turn the tractor, the cultivator units and caterpillar traction unit can be lifted and power applied to the front wheels to facilitate turning of the tractor.

References Cited in the file of this patent

UNITED STATES PATENTS

| | | |
|---|---|---|
| 1,002,043 | De Witt | Aug. 29, 1911 |
| 1,163,862 | Schenck | Dec. 14, 1915 |
| 1,169,451 | Anderson | Jan. 25, 1916 |
| 2,189,707 | Covington | Feb. 6, 1940 |